United States Patent [19]

Ernest

[11] Patent Number: 4,879,592
[45] Date of Patent: Nov. 7, 1989

[54] CAMERA WITH TWO-BLADED SHUTTER MECHANISM WITH MULTIPLE FILTER APERTURES DISPOSED FOR RELATIVE MOVEMENT TO PROVIDE SEQUENTIAL COLOR SEPARATION EXPOSURES

[75] Inventor: Paul W. Ernest, Arlington, Mass.

[73] Assignee: Polaroid Corporation, Cambridge, Mass.

[21] Appl. No.: 189,374

[22] Filed: May 2, 1988

[51] Int. Cl.[4] .................... H04N 9/07; H04N 1/028; G03B 9/08; G03B 33/08
[52] U.S. Cl. ........................................ 358/42; 358/75; 354/100; 354/226
[58] Field of Search ................ 358/29 C, 41, 42, 43, 358/44, 48, 55, 75; 354/100, 226

[56] References Cited

U.S. PATENT DOCUMENTS

| | | | |
|---|---|---|---|
| 3,299,773 | 1/1967 | Jasny | 354/100 |
| 3,918,077 | 11/1975 | Burton et al. | 354/234.1 |
| 4,079,390 | 3/1978 | Iwata et al. | 354/452 |
| 4,339,190 | 7/1982 | Sugiura | 354/234.1 |
| 4,363,034 | 12/1982 | Grancoin et al. | 358/213.13 |
| 4,401,380 | 8/1983 | Sato et al. | 354/246 |
| 4,453,816 | 6/1984 | Hiraike | 354/271.1 |
| 4,541,016 | 9/1985 | Ochi et al. | 358/228 |
| 4,551,764 | 11/1985 | Ogawa | 358/228 |
| 4,553,170 | 11/1985 | Aoki et al. | 358/225 |
| 4,566,029 | 1/1986 | Johnson | 358/50 |
| 4,570,179 | 2/1986 | Lees | 358/50 |
| 4,571,045 | 2/1986 | Uematsu | 354/245 |
| 4,571,629 | 2/1986 | Horio et al. | 358/225 |
| 4,668,067 | 5/1987 | Simon et al. | 354/246 |
| 4,827,335 | 5/1989 | Saito et al. | 358/75 |

FOREIGN PATENT DOCUMENTS 60-83920  5/1985  Japan .................... 358/29 C
61-218264  9/1986  Japan .

Primary Examiner—James J. Groody
Assistant Examiner—Randall S. Sihla
Attorney, Agent, or Firm—Edward S. Roman

[57] ABSTRACT

A color component separation camera is provided with a shutter blade mechanism in which the different color exposing filters are integrated to provide a quick series of succeeding color component exposure intervals. The blade mechanism comprises two overlapping independently driven lightweight shutter blade elements comprising filtered and unfiltered apertures arranged in side-by-side relation for selective movement into the image light path in a manner whereby a plurality of different color component separation exposure intervals may be implemented in rapid succession. In one embodiment, one shutter blade element includes three aligned apertures wherein the middle aperture is unfiltered and the end apertures are filtered at different wavelengths. The other shutter blade element comprises two aligned spaced apart apertures in which one aperture is filtered at still another wavelength and the other aperture is unfiltered. The space between the apertures operates to block scene light at the end of the exposure interval and when the filtered apertures of the other blade element are moved. In another embodiment, one shutter blade element includes three aligned apertures each filtered at different wavelengths. The other blade element includes a single unfiltered aperture and an opaque portion adjacent the aperture which operates to block scene light at the end of the exposure interval and when the filtered apertures of the other blade element are moved.

12 Claims, 4 Drawing Sheets

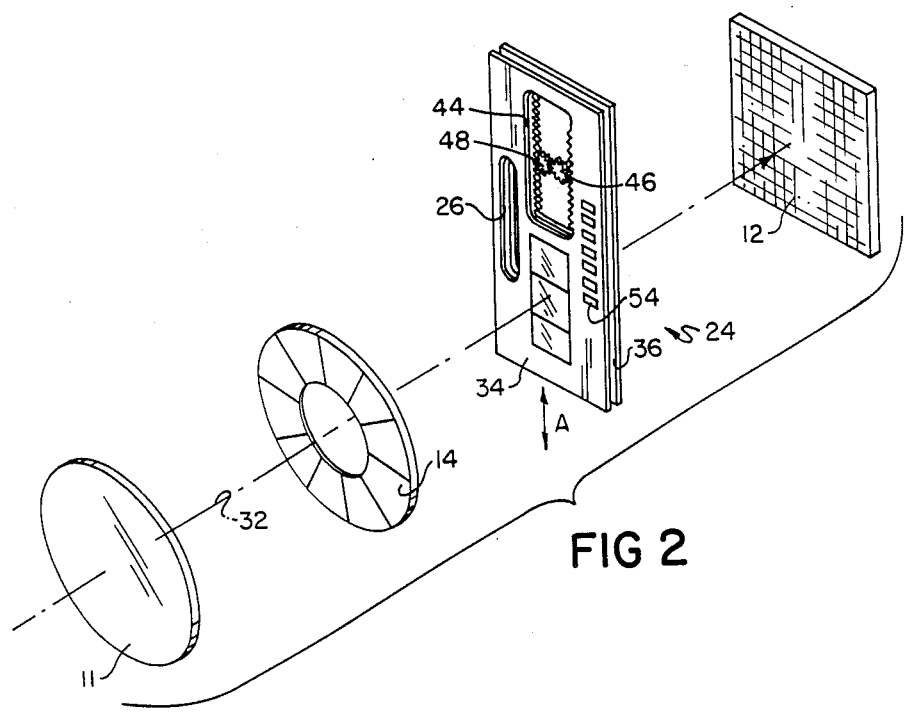
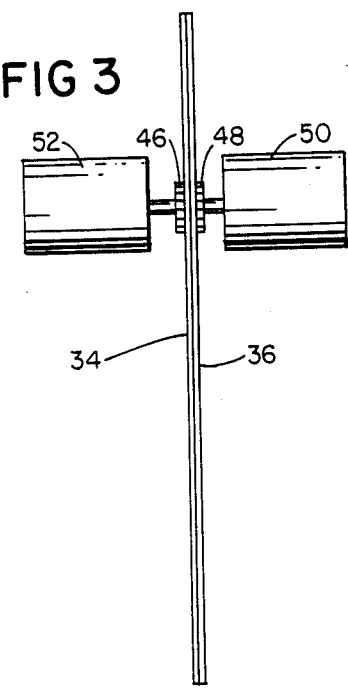

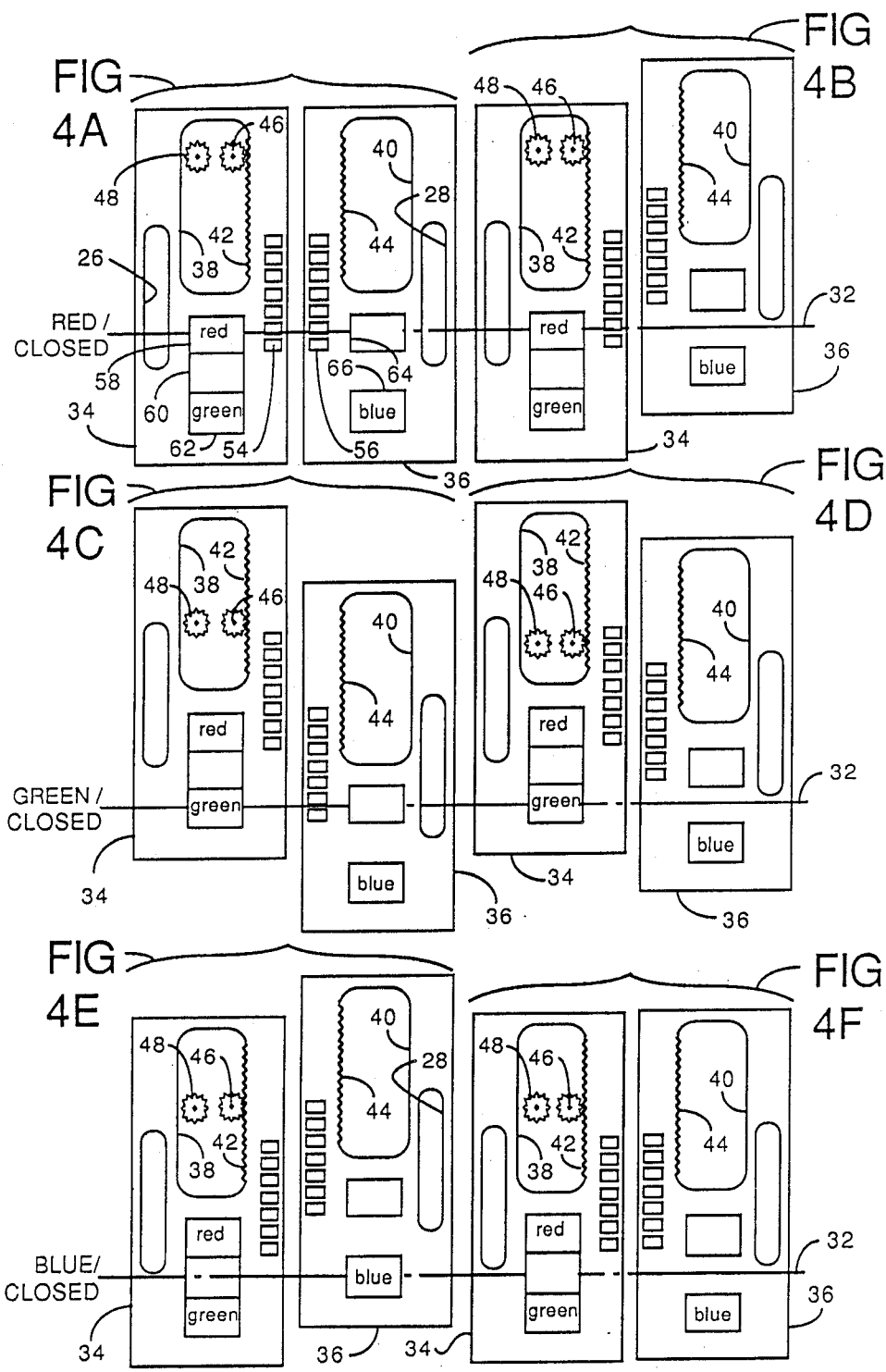

CAMERA WITH TWO-BLADED SHUTTER MECHANISM WITH MULTIPLE FILTER APERTURES DISPOSED FOR RELATIVE MOVEMENT TO PROVIDE SEQUENTIAL COLOR SEPARATION EXPOSURES

BACKGROUND OF THE INVENTION

1. Field of the Invention

This invention relates generally to a camera and color separation shutter for use therewith and, more particularly, to a camera embodying a novel color separation shutter that implements a plurality of succeeding color component separation exposures.

2. Description of the Prior Art

So-called color separation cameras have been well known in the art. These cameras record color images by superimposing three successive differently colored images taken through correspondingly colored filters. The movement of color filters in such cameras is conventionally accomplished with a rotating disk containing sectors of differently colored filters. Such disks are typically large and slow moving thus providing added weight and complexity to the color separation camera.

Therefore, it is a primary object of this invention to provide a color component separation camera which does not utilize a rotating disk containing a plurality of different colored filter sectors.

It is a further object of this invention to provide a color component separation camera in which a plurality of succeeding color component separation exposure intervals are provided by utilizing a single shutter mechanism into which a plurality of different colored filters are integrated.

Other objects of the invention will be in part obvious and will in part appear hereinafter. The invention accordingly comprises a mechanism and system possessing the construction, combination of elements and arrangement of parts which are exemplified in the following detailed disclosure.

DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment when read in connection with the accompanying drawings wherein:

FIG. 2 is a perspective view showing in greater detail a portion of the components of the camera apparatus of FIG. 1;

FIG. 3 is a side elevational view showing the color component separation shutter mechanism of this invention;

FIGS. 4A through 4F show the shutter blade elements of the color component separation shutter mechanism of this invention in various positions of operation.

SUMMARY OF THE INVENTION

A color component separation camera comprises means for defining the select image light path and photoresponsive means for receiving image defining light by way of the select image light path and for recording the received image defining light rays. A pair of elongated shutter blade elements are disposed in at least partially superimposed relation for relative movement with respect to each other along respective predetermined paths which cross the select image light path. A first one of the blade elements comprises at least a first filtered aperture for transmitting therethrough lightwaves within a first select range of wavelengths and a second filtered aperture for transmitting therethrough lightwaves within a second select range of wavelengths different from the first select range. A second one of the blade elements comprises at least one aperture for transmitting therethrough lightwaves at least within all the select ranges transmitted by all the apertures of the first shutter blade element. Exposure control means are provided for controlling the operation of the drive means during the exposure interval so as to position the shutter blade elements relative to each other in at least a first position wherein one of the filtered apertures from the first shutter blade overlaps the one aperture from the second shutter blade to transmit image defining light within the first wavelength range along the image light path. The shutter blade elements are thereafter positioned in a second position wherein the other of the filtered apertures from the first shutter blade overlaps the one aperture from the second shutter blade to change the image defining light within the second wavelength range along the image light path. The second shutter blade element further includes an opaque portion immediately adjacent its one aperture. The control means operates to cause the drive means to drive the opaque portion to its scene light blocking position along the image light path during the intervals in which the first shutter blade element is driven from one filtered aperture position aligned with the image light path to another filtered aperture position aligned with the image light path and also at the end of the entire exposure.

DESCRIPTION OF THE PREFERRED EMBODIMENT

Figure 1:
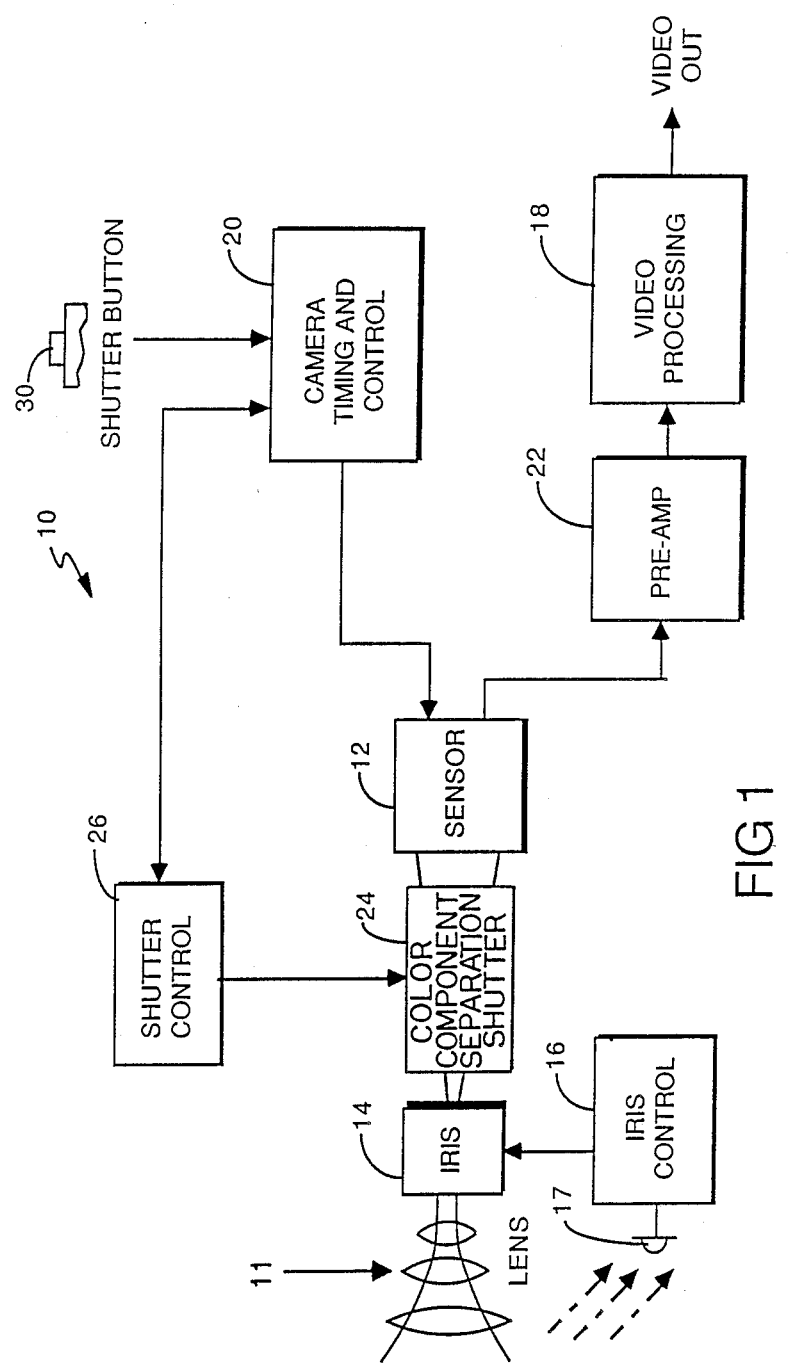
FIG. 1 is a block diagram of the camera apparatus of this invention embodying a color component separation shutter mechanism.

Referring now to FIGS. 1 and 2, there is shown a block diagram for a camera apparatus of the type embodying the color component separation filter of this invention. A camera apparatus 10 comprises an objective lens 11 which directs incident scene light along an image light path by way of a variable aperture iris diaphragm 14 and a color component separation shutter 24 which operates in the manner of this invention to be subsequently described to ultimately impinge upon a light sensor 12. The sensor 12 preferably comprises a two-dimensional photosensitive array such as a high resolution charge coupled device (CCD) or charge injection device (CID). The image sensing array preferably comprises a plurality of image sensing elements or pixels arranged in a two-dimensional array wherein each image sensing pixel converts the incident image defining scene light rays into corresponding analog electronic information signal values. Preferably, the image sensing pixels are arranged in columns and rows as is well known in the art. As will be readily understood, image sensing arrays, particularly for sensing still images as in the instant case, preferably comprise a large number of image sensing elements or pixels in the order of 500,000 or greater. Although the invention is described preferably in relation to an electronic imaging still camera embodying electronic photosensitive sensor as previously described, it will be readily understood that the color component separation shutter mechanism of this invention is by no means so limited and may also be utilized in conventional still image cameras where in place of the sensor 12 there is provided a film plane for holding conventional photographic film for exposure in a manner of this invention provided by the color component separation shutter 24.

The variable aperture iris diaphragm 14 may be controlled in a conventional manner by an iris control 16 in response to the intensity of incident scene light detected by a photoresponsive element or diode 17. The image defining electronic information analog output signal from the sensor 12 is directed by way of a preamp 22 to a conventional video processing circuit 18 which operates to process the input signal to provide a conventional video output signal format such as NTSC. The processing circuit 18 also operates in conjunction with a camera timing and control circuit 20 to control the integration and readout of image defining electronic information signals from the sensor 12. A still image exposure interval may be commenced by the camera user upon manual actuation of a shutter button 30 to actuate the timing and control circuit 20. The camera timing and control circuit 20 operates by way of a shutter control circuit 26 to control the opening and closing of the color component separation shutter 24 in the manner of this invention to be subsequently described in greater detail herein to effect a still exposure interval.

Referring now to FIG. 2 there is shown in greater detail the physical orientation of the objective lens 11, the variable aperture iris diaphragm 14, the color separation shutter 24 and the sensor 12 in relation to the image light path as defined by the center optical axis 32 of the objective lens 11. In this context, it will be noted that the shutter 24 is between the variable aperture diaphragm 14 and the image sensor 12 and, while not illustrated as such in FIG. 2, will be positioned in practice as close as possible to the sensor 12 in keeping with such design criteria as the exposure area of the sensor relative to overall camera size and configuration, the focal length of the objective lens 10 and the like.

Referring now to FIGS. 4A–FIGS. 4F in conjunction with FIGS. 2 and 3, there are shown in greater detail the structural configuration of the color separation shutter mechanism 24 of this invention. The shutter 24 comprises a pair of thin planar shutter blade elements 34 and 36 each comprising a lightweight material such as Mylar or other material of comparable physical configuration. The shutter blade elements 34 and 36 have a substantially identical elongated rectangular exterior configuration and include at one end portion thereof laterally offset longitudinal openings 38 and 40, respectively. One edge of each opening 38 and 40 is formed with teeth to provide a linear rack 42 on the blade 34 and a similar rack 44 on the blade 36. In the assembled shutter 24, the shutter blade elements 34 and 36 are superimposed in overlapping relation as shown in FIG. 2 for linear movement in the directions as shown at A. Each of the racks 42 and 44 are engaged by respective pinion gears 46 and 48 as shown in FIGS. 2 and 3. Referring particularly to FIG. 3, it can be seen that each of the pinion gears 46 and 48 connect, respectively, to one of two stepper motors 50 and 52. The stepper motors 50 and 52 are controlled by the shutter control circuit 26 to drive each of the shutter blade elements 34 and 36 independently of each other in the manner of this invention to be subsequently described.

Each of the shutter blades 34 and 36 comprises, respectively, a plurality of linearly spaced apart encoder slots 54 and 56 which are monitored by photoresponsive elements (not shown) in a well-known manner to provide a constant determination of the position of each shutter blade element which is communicated to the shutter control circuit 26. It will be readily understood that the encoder slots 54 of the shutter blade element 34 are overlapped by an elongated aperture 28 in the shutter blade element 36 to accommodate the positional monitoring of the encoder slots 54. In like manner, the encoder slots 56 and the shutter blade element 36 are overlapped by an elongated aperture 26 in the shutter blade element 34 to accommodate the positional monitoring of the encoder slots 56. As will be readily understood, each stepper motor 50 and 52 may be independently controlled by the shutter control 26 to drive its one respective connecting shutter blade element independently of the other.

Referring now to FIG. 4A, it can be seen that the shutter blade element 34 comprises three rectangular apertures 58, 60 and 62 linearly aligned in immediate adjacent relationship with respect to each other. Aperture 58 is filtered to transmit therethrough lightwaves within a first select wavelength range preferably corresponding in this example to red light. The aperture 62 is also filtered to transmit therethrough lightwaves within a second different select range of wavelengths preferably for this example corresponding to green light. The middle aperture 60 is preferably unfiltered to transmit therethrough all wavelengths of light. The shutter blade element 36 preferably comprises two rectangularly shaped spaced apart apertures 64 and 66. The aperture 66 is preferably filtered to transmit therethrough lightwaves within a third different select range of wavelengths which for this example preferably corresponds to blue light. The aperture 64 is preferably unfiltered in the manner of the aperture 60 in the shutter blade element 34 to transmit therethrough all wavelengths of light. It will be noted that the apertures 64 and 66 are spaced apart by an opaque section substantially equivalent in width to the aperture width. Thus, movement of the opaque portion between the apertures 64 and 66 into the image light path has the effect of blocking the passage of scene light to the sensor 12.

Depression of the shutter button 30 commences a still image exposure interval in which the shutter blade elements 34 and 36 are driven to the positions as shown in FIG. 4A by the stepper motors 50 and 52, respectively, as controlled by the shutter control circuit 26. It will be readily understood that the shutter blade elements 34 and 36 in practice overlap each other but for purposes of clarity in illustrating the various positions are shown in side-by-side relationship with respect to the optical axis 32. Thus, for the first position as shown in FIG. 4A, the red filter aperture 58 of the shutter blade element 34 and the unfiltered aperture 64 of the shutter 36 overlap the optical axis 32 to transmit red filtered scene light to the sensor 12. In this manner, the red component of the incident scene light is recorded in high resolution by the sensor 12. The shutter blade element 36 is next driven by its stepper motor 50 to the position shown in FIG. 4B where the opaque portion between the apertures 64 and 66 overlaps the optical axis 32 so as to block the passage of scene light to the sensor 12 and thereby terminate the red color separation component exposure interval. During this interval, the red color component signal information sensed by the sensor 12 in the preceding exposure interval is transferred out by way of the video processing circuit 18 in a conventional manner.

The shutter blade elements 34 and 36 are next driven, respectively, to the positions as shown in FIG. 4C where the green filtered aperture 62 of the shutter blade element 34 and the unfiltered aperture 64 of the shutter blade element 36 overlap the optical axis 32 to transmit therethrough green filtered scene light to the sensor 12. At the termination of the green color component separation exposure interval, shutter blade element 36 is driven by its stepper motor 50 to the scene light blocking position as shown in FIG. 4D where the opaque portion between the apertures 64 and 66 blocks the passage of scene light to the sensor 12. During this interval, the green image signal information sensed during the preceding green color component separation exposure interval is transferred from the sensor 12 to the video processing circuit 18 in a well-known manner.

The next color component separation exposure interval commences upon the movement of the shutter blade elements 34 and 36 to the positions as shown in FIG. 4E. As can be seen from the drawing, the unfiltered aperture 60 of the shutter blade element 34 and the blue filtered aperture 66 of the shutter blade element 36 overlap the optical path 32 to transmit blue filtered scene light therethrough to the sensor 12. Upon termination of the blue color component separation exposure interval, the shutter blade element 36 is moved to the position as shown in FIG. 4F where the opaque portion between the apertures 64 and 66 overlaps the optical axis 32 to block the transmission of blue filtered scene light to the sensor 12. During this interval, the blue color component signal information sensed by the sensor 12 during the previous exposure interval is transferred therefrom by way of the video processing circuit 18. Since the blue color component would normally be the last color component to be sensed, movement of the shutter blade element 36 to the position as shown in FIG. 4F would normally terminate the entire color component separation exposure.

The shutter blade elements 34 and 36 are of lightweight construction and thus may be rapidly moved between the positions as shown in FIGS. 4A-4F so that each color component separation exposure may be achieved in as little as 18 milliseconds. Also, as is readily apparent, each color component separation exposure interval may be individually controlled to achieve the direct exposure of each color separation component. The termination of each color component separation exposure interval is preferably accomplished electronically by way of the sensor 12 and the shuttering provided by the opaque portion of the blade element 36 during the intervals between each succeeding color component separation exposure only operates to inhibit the further integration of scene light during intervals in which image signal information are transferred from the sensor. As will be readily understood, most electronic sensors are relatively sensitive to incident scene light during the interval during which image signal information are read out.

Figure 5:
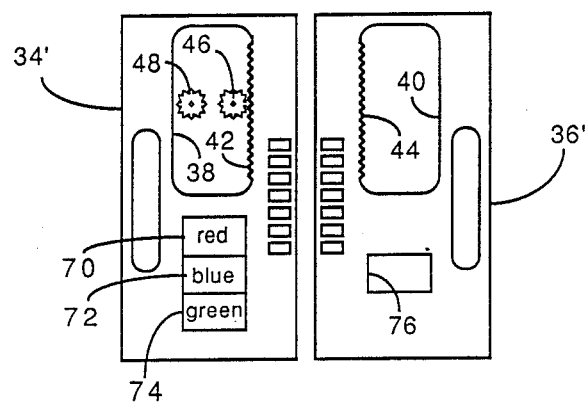
FIG. 5 shows an alternate embodiment for the shutter blade elements of the color component separation shutter mechanism of this invention.

Referring now to FIG. 5 where like numerals designate previously-described elements, there is shown an alternate embodiment for the shutter blade elements of this invention comprising shutter blade elements 34' and 36'. Shutter blade element 34' comprises three filtered apertures 70, 72 and 74 aligned in linear immediate adjacent relationship with respect to each other. The aperture 70 is filtered to transmit therethrough lightwaves within a first select range of wavelengths corresponding for this example to red colored scene light. The aperture 72 is also filtered to transmit therethrough scene light within a different select range of wavelengths corresponding in this example to blue colored scene light. The aperture 74 is also filtered to transmit therethrough scene light within a third different select range of wavelengths which in this example corresponds to green colored light. Shutter blade element 36' comprises a single unfiltered aperture 76 for transmitting therethrough unfiltered scene light within all wavelengths of light.

The color component separation exposure interval commences in the aforementioned manner upon the depression of the shutter button 30 whereupon the shutter blade elements 34', 36' are driven by the respective stepper motors 50 and 52 from an initial position in which the opaque portion of the shutter blade element 36' blocks the transmission of scene light to a scene light admitting position in which the red filtered aperture 70 and the unfiltered aperture 76 are aligned with the optical path 32. In this manner, the red color component separation exposure interval is effected. At the termination of the red color component separation exposure interval, the opaque portion of the shutter blade element 36 is moved into overlapping relation with the optical axis 32 during the time interval in which the red color component signal information is transferred from the sensor 12 to the video processor 18. The blue and green color component separation exposure intervals proceed in succeeding manner as previously described. Again, there are provided three color separation component exposures during which red, blue and green colored scene light are directed in three successive exposure intervals to the sensor 12. Thus, each color component separation of the image scene light may be sensed in high resolution in a timely manner without the use of extraneous filter wheels as previously discussed.

Although the unfiltered apertures have been described as transmitting lightwaves without restriction as to the range of wavelengths, it will be readily understood that such unfiltered apertures may have infrared or ultraviolet filters and are only required to transmit therethrough lightwaves within all the ranges of wavelengths filtered by the above-described filtered apertures. Thus, the unfiltered apertures could be constrained to transmit therethrough only red, green and blue filtered scene light for the foregoing example.

Other embodiments of the invention including additions, subtractions, deletions, and other modifications of the preferred disclosed embodiments of the invention will be obvious to those skilled in the art and are within the scope of the following claims.

What is claimed is:

1. A color separation shutter mechanism comprising:
   a pair of elongated shutter blade elements disposed in at least partially superimposed relation for relative movement with respect to each other along respective predetermined paths which cross a select image light path;
   drive means operatively connecting each of said shutter blade elements for moving each of said blade elements independently of each other along said predetermined paths across the select image light path;

one of said blade elements comprising at least a first filtered aperture for transmitting lightwaves therethrough within a first select range of wavelengths and a second filtered aperture for transmitting lightwaves therethrough within a second select range of wavelengths different from said first select range, and the other of said blade elements comprising at least one aperture for transmitting lightwaves therethrough at least within all the select ranges transmitted by all the apertures of said one shutter blade element, said drive means being operable to position said shutter blade elements relative to each other in at least a first position wherein one of said filtered apertures from said one blade element overlaps said one aperture from said other blade element to transmit image defining light within said first wavelength range along said image light path and then a second position wherein the other of said filtered apertures from said one blade element overlaps said one aperture from said other blade element to transmit image defining light within said second wavelength range along said image light path, and wherein said other shutter blade element includes an opaque portion immediately adjacent its said one aperture, said opaque portion being drivable into scene light blocking position along said image light path during the intervals during which said one blade element is driven from one filtered aperture position aligned with the image light path to another filtered aperture position aligned with the image light path and at the end of an exposure interval.

2. The shutter mechanism of claim 1 wherein said shutter blade elements are disposed for overlapping substantially linear movement with respect to each other an said drive means include separate drivers for positioning each shutter blade element.

3. The shutter mechanism of claim 2 wherein each of said shutter blade elements includes a plurality of spaced apart encoder slots for facilitating the constant determination of the position of each shutter blade element with respect to each other and the image light path.

4. The shutter mechanism of claim 3 wherein said drive means comprises means defining a linear rack on each of said blade elements, a pinion gear in mesh with each of said linear racks and a stepper motor for driving each of said pinion gears.

5. The shutter mechanism of claim 1 wherein said one shutter blade element includes a third filtered aperture for transmitting lightwaves therethrough within a third select range of wavelengths different from said first and second select range of wavelengths; said first, second and third filtered apertures of said one shutter blade element being linearly aligned in immediate adjacent relationship with respect to each other.

6. The shutter mechanism of claim 1 wherein said one shutter blade element includes a third aperture between its said first and second apertures for transmitting therethrough lightwaves within at least all the select wavelength ranges transmitted by all the other apertures of said one and other shutter blade elements and wherein said other shutter blade element includes a second filtered aperture for transmitting lightwaves therethrough within a third select range of wavelengths different from said first and second select ranges of wavelengths, said first, second and third apertures of said one shutter blade element being linearly aligned in immediate adjacent relationship with respect to each other and said first and second apertures of said other shutter blade element being linearly aligned in spaced apart relation with respect to each other.

7. A camera comprising:

means for defining a select image light path;

photoresponsive means for receiving image defining light by way of said select image light path and recording said received image defining light rays;

a pair of elongated shutter blade elements disposed in at least partially superimposed relation for relative movement with respect to each other along respective predetermined paths which cross said select image light path; one of said blade elements comprising at least a first filtered aperture for transmitting therethrough lightwaves within a first select range of wavelengths and a second filtered aperture for transmitting therethrough lightwaves within a second select range of wavelengths different from said first select range, and the other of said blade elements comprising at least one aperture for transmitting therethrough lightwaves at least within all the select ranges transmitted by all the apertures of said one shutter blade element;

drive means operatively connecting each of said shutter blade elements for moving each of said shutter blade elements independently of each other along said predetermined paths across the select image light path; and exposure control means for controlling the operation of said drive means during an exposure interval so as to position said shutter blade elements relative to each other in at least a first position wherein one of said filtered apertures from said one blade element overlaps said one aperture from said other blade element to transmit image defining light within said first wavelength range along said image light path and then a second position wherein the other of said filtered apertures from said one blade element overlaps said one aperture from said other blade element to transmit image defining light within said second wavelength range along said image light path and wherein said other shutter blade element includes an opaque portion immediately adjacent its said one aperture, said control means being further operable to cause said drive means to drive said opaque portion to its scene light blocking position along said image light path during the intervals in which said one blade element is driven from one filtered aperture position aligned with the image light path to another filtered aperture position aligned with the light path and at the end of the exposure interval.

8. The camera of claim 7 wherein said shutter blade elements are disposed for overlapping substantially linear movement with respect to each other and said drive means include separate drivers for positioning each shutter blade element.

9. The camera of claim 8 wherein each of said shutter blade elements includes a plurality of spaced apart encoder slots and said control means includes photoresponsive means for optically reading said spaced apart encoder slots for constantly determining the position of each shutter blade element with respect to each other and the image light path.

10. The camera of claim 9 wherein said drive means comprises means defining a linear rack on each of said blade elements, a pinion gear in mesh with each of said linear racks and a stepper motor for driving each of said pinion gears.

11. The camera of claim 7 wherein said one shutter blade element includes a third filtered aperture for transmitting lightwaves therethrough within a third select range of wavelengths different from said first and second select range of wavelengths; said first, second and third filtered apertures of said one shutter blade element being linearly aligned in immediate adjacent relationship with respect to each other.

12. The camera of claim 7 wherein said one shutter blade element includes a third aperture between its said first and second apertures for transmitting therethrough lightwaves within at least all the select wavelength ranges transmitted by all the other apertures of said one and other shutter blade elements and wherein said other shutter blade element includes a second filtered aperture for transmitting lightwaves therethrough within a third select range of wavelengths different from said first and second select range of wavelengths, said first, second and third apertures of said one shutter blade element being linearly aligned in immediate adjacent relationship with respect to each other and said first and second apertures of said other shutter blade element being linearly aligned in spaced apart relation with respect to each other.

* * * * *